UNITED STATES PATENT OFFICE.

RUDOLF ADLER, OF AMSTERDAM, NETHERLANDS, ASSIGNOR TO NAAMLOOZE VENNOOTSCHAP ALGEMEENE UITVINDING EXPLOITATIË MAATSCHAPPIJ, OF AMSTERDAM, NETHERLANDS, A FIRM.

LECITH-ALBUMIN COMPOUND AND PROCESS OF MAKING THE SAME.

1,057,316.     Specification of Letters Patent.     Patented Mar. 25, 1913.

No Drawing.     Application filed February 7, 1912. Serial No. 676,118.

*To all whom it may concern:*

Be it known that I, RUDOLF ADLER, a chemist and doctor of philosophy, a subject of the Emperor of Austria-Hungary, and a resident of 245-247 Haarlemmerweg, in the city of Amsterdam, Netherlands, have invented a certain new and useful Lecith-Albumin Compound and Process of Making the Same from Fish and other Sea and Sweet Water Animals, of which the following is a specification.

This invention relates to a new lecith-albumin compound and process of making the same from aqueous extracts of fresh water as well as sea water fishes. Albumin compounds which contain lecithin, have already been obtained from fish, and in particular from the spawn, Hammersteen having used the eggs of the perch, Levene those of the haddock and Walter carp eggs.

Now it has been ascertained that the extract from the entire body of the fish with the exception of the intestines contains lecith-albumin compounds which are also found in animal cellular tissue. The extraction of the fish which is preferably comminuted, is effected in about five times the quantity of water at a moderately hot temperature. The most favorable temperature of extraction is between 40 and 50 degrees centigrade, since, at a lower temperature the extraction goes on rather slowly, while higher temperatures and particularly continued boiling with water will cause a decomposition of the lecith-albumin compounds. It has also been found to be of advantage to add a little chloroform and toluol to the liquid while the extraction is going on, as by this addition the extracting process is accelerated and any putrefaction otherwise likely to occur, is thus prevented. The slightly opalescent extract is mixed with a mixture of equal parts of animal charcoal and kieselguhr, by which means the mucous substances and any traces of fat which might have been carried into the extract are retained by the absorbent materials. By this means only, it becomes possible to produce a clear filtrate. Sulfurous acid gas is then made to pass into the perfectly clear, yellowish filtrate of the extract, or a solution of sulfur dioxid is added until the heavy precipitate originally produced has become completely redissolved, and only a slight turbidity of mucinous substances remains. In order to facilitate the separation of the mucous substances which are insoluble from the liquid, a filter press may be employed. The amount of sulfurous acid is determined by analysis, and to the perfectly clear filtrate is added the exact amount of a water-soluble substance of alkaline reaction such as carbonate or hydrate of soda or the like, calculated to be sufficient to neutralize the sulfurous acid, any excess of the neutralizing agent being avoided. The flocculent snow white precipitate is separated by pressure and washed with cold distilled water, until the filtrate, if tested with barium chlorid, does not yield any further precipitates of barium sulfite, that is to say until the albumin precipitate has been washed perfectly free from salts. The press cakes obtained by filtration, are then dried at about 50 to 70 degrees centigrade, preferably *in vacuo*, and may then be ground to a fine powder if desired.

The process may for example be carried out as follows:—100 kilograms of haddock freed from the intestines are cut into thin slices and are then extracted at a temperature of 40 to 50 degrees with five hundred liters of water on a reflux condenser for 8 to 10 hours, in the presence of 250 grams of a mixture of equal parts of chloroform and toluol. After the lapse of this time, the extract is drawn off, mixed with 10 kilograms of a mixture of washed animal charcoal and kieselguhr, and is then passed through a filtering press. Into the clear filtrate, sulfurous acid is made to pass in the manner above described or an aqueous solution of sulfur dioxid is added; 5 kilograms of kieselguhr are then added, and the filtration is repeated. After the neutralizing alkali has been added, the precipitate is separated by filter pressing, washed and dried. The substance obtained in this manner forms a white powder which is perfectly and clearly soluble in acids and in alkalis. When treated for five hours in a Soxlet extracting apparatus with a mixture of equal parts of ether and alcohol, 2.5 to 3 per cent. of an oily substance are extracted, which become solidified into a wax-like pronounced yellow mass after having been left to stand for some time. It swells up in water and from alcoholic and other solution, the mass may be separated by the addition of acetone. On being burned on platinum foil, the substance leaves a clear and rapidly solidifying residue of white ashes which consist mainly of phosphoric acid. On the addition of cadmium chlorid, the alcoholic solution of the mass produces a voluminous precipitate. When the mass is kept in suspension in water and is heated in this condition for some length of time with barium hydrate solution, the filtrate after the removal of the barium by the addition of platinum chlorid, yields a crystalline, light yellow precipitate. The native substance yields a flocculent precipitate with Almen's reagent, gives the xanthoproteid - reaction, the Biuret reaction and a moderate reaction with Molish reagent.

As appears from the tests hereinbefore mentioned, the substance obtained by the process described, constitutes a lecith-albumin.

The substances produced according to this process is an excellent nutritive food preparation which is distinguished from the lecith-albumins, obtained from eggs and from milk, by the fact that it can be produced at a considerably lower expense, so that it can also be used by those parts of the population, who cannot afford the lecith-albumins of commerce, obtained from eggs or milk, and this fact will moreover make this product, as obtained by my process, particularly adapted for the clinical treatment of great masses of people and for the medical treatment of the poor, for whom there is still need of a cheap lecithin preparation in consequence of the high price of the raw materials heretofore employed.

What I claim and desire to secure by Letters Patent is:—

1. The process of manufacturing a lecith-albumin compound which consists in extracting fish by warm water at about 40 to 60 degrees centigrade, mixing and filtering the extract with a mixture of animal charcoal and kieselguhr and thereby freeing it from fat and from mucous substances, passing sulfurous acid through the filtrate, then filtering off the mucous substances which are insoluble in sulfurous acid, in the presence of kieselguhr, neutralizing the sulfurous acid by an alkaline substance, separating the ensuing precipitate, and drying it.

2. Process of manufacturing lecith-albumin substances from fish which consists in extracting fish at a moderate temperature with water in the presence of a mixture of chloroform and toluol, separating the fat and mucous substances, and liberating the lecithin substance.

3. As a new article of manufacture, a lecith-albumin compound derived from fish and other sea and sweet water animals, said compound being free of mucin and nuclein and having the following properties: It has a white color, swells up in water, on being burned leaves ashes consisting mainly of phosphoric acid, yields a flocculent precipitate with Almen's reagent, gives the xanthoproteid-reaction, the Biuret reaction and a moderate reaction with Molish reagents.

In witness whereof I have hereunto signed my name in the presence of two subscribing witnesses.

RUDOLF ADLER.

Witnesses:
 FILL. RESSER,
 FRIEDRICH HERBOLD.